April 28, 1953 M. L. VAN NESS 2,636,788
PACKING GLAND REPLACEMENT DEVICE
Filed March 26, 1951 2 SHEETS—SHEET 1
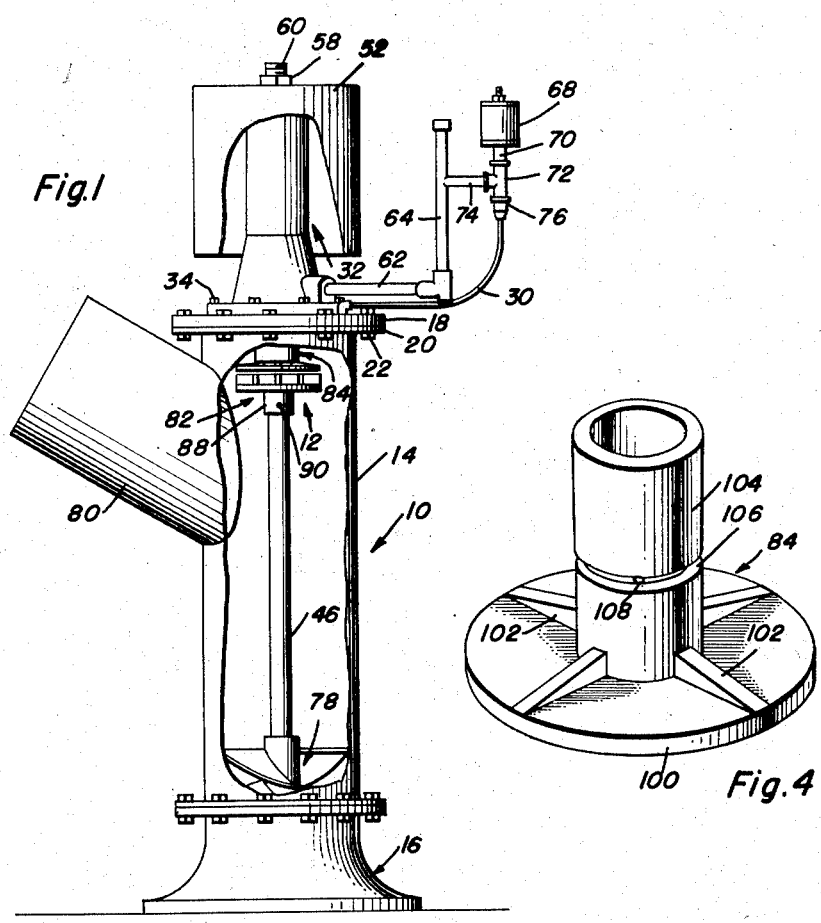
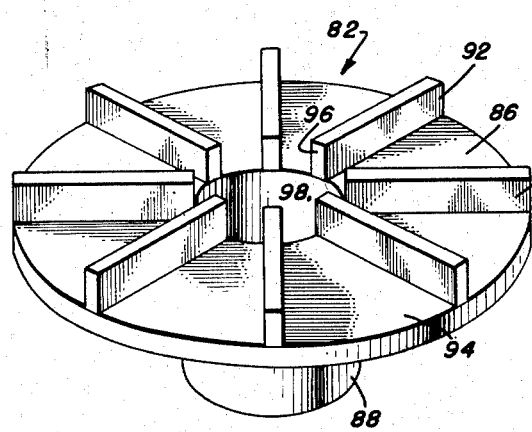
Marvin L. Van Ness
INVENTOR.

Marvin L. Van Ness
INVENTOR.

Patented Apr. 28, 1953

2,636,788

UNITED STATES PATENT OFFICE 2,636,788

PACKING GLAND REPLACEMENT DEVICE

Marvin L. Van Ness, Welsh, La.

Application March 26, 1951, Serial No. 217,449

8 Claims. (Cl. 308—36.4)

The present invention relates to improvements in pumps or the like, and more particularly to a device which is adapted to perform the functions of a packing gland and obviate the necessity of using a conventional packing gland.

An object of the present invention is to provide a packing gland replacement device for low pressure pumps or the like and which replacement device is adapted to be positioned adjacent to the pump shaft bearing opening of the pump housing whereby fluid will be prevented from passing through the bearing opening and the necessity of employing a conventional packing gland is obviated.

A further object of the present invention resides in the provision of an impeller-like element which is fixedly secured to the rotating pump shaft and in juxtaposition to the opening rotatably supporting the pump shaft whereby fluid is centrifugally directed away from the opening in the pump housing.

Still another object of the present invention resides in the provision of a packing gland replacement device which is comprised of a bushing bearing relatively fixedly supported within a bearing opening in a pump housing for rotatably supporting the pump shaft and in the provision of an impeller-like element relatively fixedly secured to the rotating pump shaft and in juxtaposition to the bushing bearing for centrifugally directing the fluid away from the bushing bearing, the blades of the impeller-like element rotating in juxtaposition to the face of the bushing bearing to accentuate the centrifugal action.

Various other objects and advantages will become apparent from the detailed description to follow. The best form in which I have contemplated applying my invention is clearly illustrated in the accompanying drawings, wherein:

Figure 1 is a side elevational view of a substantially conventional pump sold under the trade name "Lo-Lift," the pump being of the low pressure type employed in irrigation and drainage arrangements, with parts broken away showing the packing gland replacement device;

Figure 3 is a detail perspective view of the impeller-like element which constitutes a major element of the packing gland replacement device; and Figure 4 is a detail perspective view of the bushing bearing element which constitutes a second major element of the packing gland replacement device.

Figure 2:
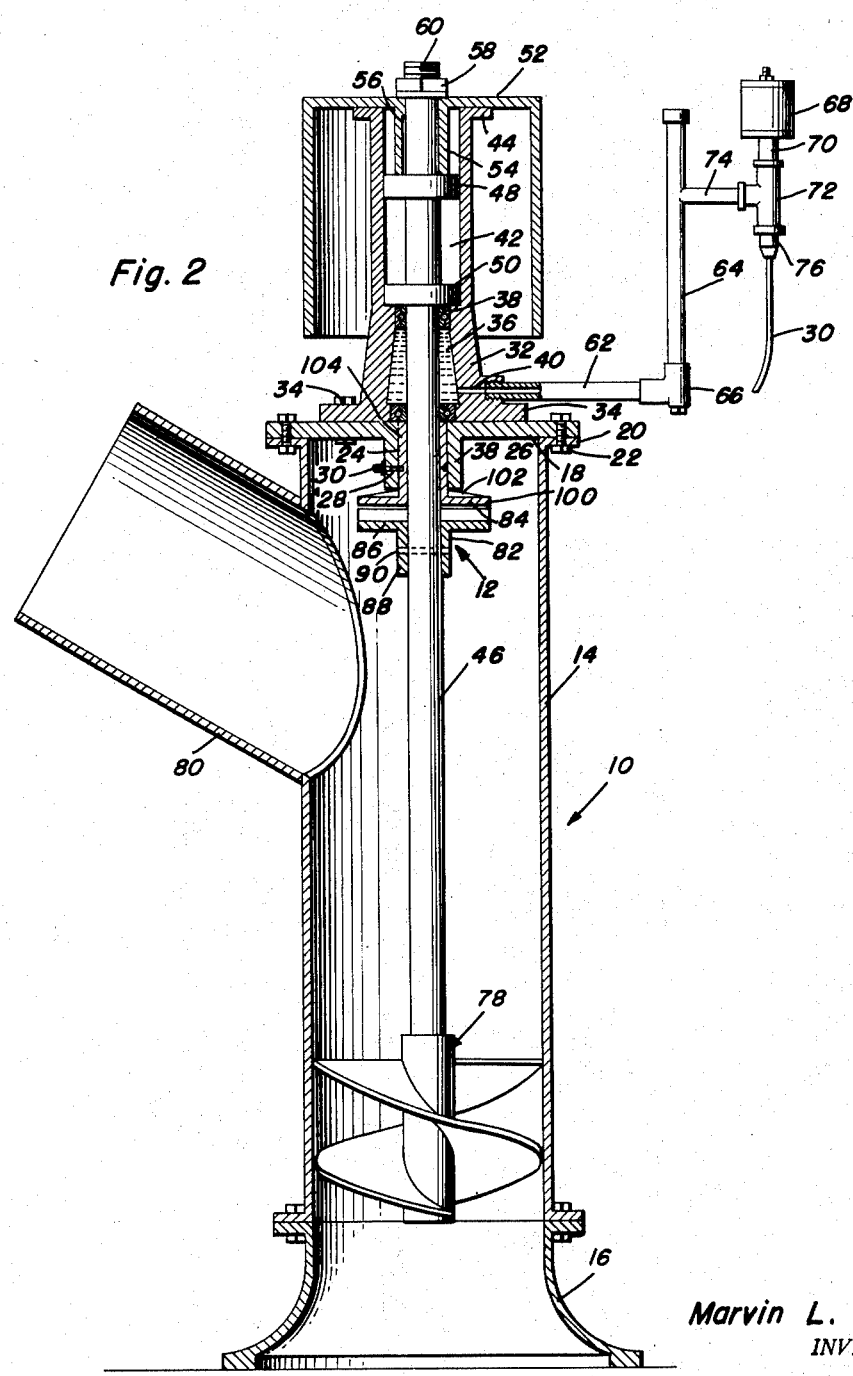
Figure 2 is a vertical sectional view through the pump of Figure 1.

Referring more particularly to the drawings, wherein like numerals designate like parts throughout, the numeral 10 designates generally the conventional pump of the low-pressure type which is adapted for irrigation and drainage usage and the numeral 12 designates generally the packing gland replacement device.

The pump 10, as shown in Figures 1 and 2, is comprised of a tubular housing 14 having an inlet flange connection at 16 for mounting the pump on a source of liquid, and has its upper end provided with a closure plate 18 secured to the flange 20 at the upper end of the housing 14 by means of the bolts 22. The closure plate 18 has an opening formed therethrough with a sleeve integrally formed to the plate 18 and designated by the numeral 26, the opening 24 through the sleeve 26 being adapted to receive a bearing element. The sleeve 26 is formed with a radial opening 28 to provide communication between the interior and exterior of the sleeve and a lubricant conduit 30 is fixedly secured within the opening 28 for feeding lubricant to the interior of the sleeve 26.

Mounted on the closure plate 18 is the elongated bearing housing 32 which has its lower flanged end 34 secured to the plate 18 by means of bolts 34. The housing 32 has a first chamber 36 with a pair of ball bearing units 38 supported at each end of the chamber 36 and within the housing 32. An inlet bore 40 is formed in the housing 32 to provide communication between the chamber 36 and the exterior of the housing 32.

The upper end of the bearing housing 32 is formed with a longitudinal bore 42 and terminates in a flanged end 44. The pump 10 is provided with a pump shaft 46 which is rotatably carried by the ball bearing units 38. An upper intermediate portion of the pump shaft 46 is formed with a pair of annular rings 48 and 50 which are rotatably received within the chamber 42 of the bearing housing 32.

The means by which the pump shaft 46 is driven includes the driven pulley 52 which is of cylindrical form having an inner axially disposed sleeve 54 keyed to the pump shaft 46 by means of the key 56. The pulley member 52 is fixedly secured to the pump shaft 46 by means of the nut 58 threadably engaged over the upper threaded end 60 of the pump shaft 46.

The means for supplying lubricant to the chamber 36, whereby the ball bearing units 38 will be lubricated, includes the inlet conduit section 62 which is threadably engaged in the bore 40 of the bearing housing 32. A second conduit section 64 is connected to the first section 62 by means of the L-shaped connector 66, whereby the second section 64 can be maintained in vertical relation to the first section 62. An oil reservoir 68 having an outlet 70 feeds lubricant to the T-fitting 72, which has one outlet connected to the second conduit section 64 by means of the second conduit extension 74, and feeds a restricted amount of lubricant to the conduit 30 by means of the adapter 76. As hereinabove pointed out, the conduit 30 supplies fluid to the sleeve 26 and through the radial bore 28 of the sleeve 26 to lubricate the interior of the sleeve 26.

The lower end of the pump shaft 46 is formed with a screw-type pump impeller 78 whereby liquid can be pumped through the housing 14 and out the outlet 80. In conventional pumps, a packing gland is provided for preventing leakage of fluid through the bearing opening in the housing of the pump. However, the present invention contemplates the provision of a device which replaces conventional packing glands and which operates in an effective manner to centrifugally direct the liquid from the bearing opening in the housing, thereby obviating the necessity of employing a packing gland.

The packing gland replacement device 12 includes an impeller element 82 and a bushing bearing element 84. The impeller element 82 is comprised of a flat circular and apertured plate 86 having a sleeve 88 integrally formed therewith and axially extending therefrom. The sleeve 88 slidably receives the pump shaft 46 and is fixedly secured thereto by means of the pin 90. The plate 86 is formed with a plurality of radially disposed vanes 92 which are fixedly secured to the upper face 94 of the plate and have their inner ends 96 lying in a cylindrical locus 98 coincidental with the inner surface of the sleeve 88. The impeller element is shown best in Figure 3 and the assembled relation between the impeller element and the pump shaft is best shown in Figure 2.

The bushing bearing element 84 is comprised of a flat circular plate of a diameter substantially equal to the plate 86, the plate 100 having reinforcing ribs 102 on its back side and being integrally formed with the sleeve portion 104 which is received within the sleeve 26 and is in fixed relation to the sleeve 26. The sleeve portion 104 has a peripheral groove 106 formed therein with a radial aperture 108 providing communication between the groove 106 and the interior of the sleeve portion 104. When the sleeve portion 104 is received within the sleeve 26, the groove 106 will lie in the same plane as the radial bore 28, whereby lubricant from the conduit 30 can be supplied to the groove 106 and to the interior of the sleeve portion 104 of the bushing bearing element 84. It will thus be seen that a lubricated bearing is provided for the pump shaft 46 and that the flat plate 100 of the bushing bearing element 84 is in juxtaposition to the impeller vanes 92 of the impeller element 82, whereby any liquid adjacent the bearing opening for the pump shaft 46 will be centrifugally diverted, thereby preventing leakage through the bushing bearing and around the pump shaft.

In view of the foregoing, it will be seen that a device has been provided which will obviate the necessity of employing packing glands in combination with pump shafts in low pressure pumps.

Having thus described my invention, what is claimed as new is:

1. A packing replacement device for pumps including a pump shaft rotatably carried by a bearing in an opening in a pump housing, said packing replacement device comprising an impeller means fixedly secured to said shaft for rotation therewith and disposed in juxtaposition to said bearing and opening in said pump housing for centrifugally forcing fluid away from said bearing and opening, said impeller means including a flat circular and apertured plate and sleeve integrally secured thereto and axially extending therefrom, a plurality of radially disposed vanes fixedly secured to one face of said plate and having their inner ends lying in a cylindrical locus coincidental with an inner surface of said sleeve.

2. A packing replacement device for pumps including a pump shaft rotatably carried by a bearing in an opening in a pump housing, said packing replacement device comprising an impeller means fixedly secured to said shaft for rotation therewith and disposed in juxtaposition to said bearing and opening in said pump housing for centrifugally forcing fluid away from said bearing and opening, said impeller means including a flat circular and apertured plate and sleeve integrally secured thereto and axially extending therefrom, a plurality of radially disposed vanes fixedly secured to one face of said plate and having their inner ends lying in a cylindrical locus coincidental with an inner surface of said sleeve, said sleeve being slidably received on the pump shaft and fixedly positioned thereon by means of a pin extending through said sleeve and shaft.

3. A packing replacement device for pumps including a pump shaft rotatably carried by a bearing in an opening in a pump housing, said packing replacement device comprising an impeller means fixedly secured to said shaft for rotation therewith and disposed in juxtaposition to said bearing and opening in said pump housing for centrifugally forcing fluid away from said bearing and opening, said impeller means including a flat circular and apertured plate and sleeve integrally secured thereto and axially extending therefrom, a plurality of radially disposed vanes fixedly secured to one face of said plate and having their inner ends lying in a cylindrical locus coincidental with an inner surface of said sleeve, said one face of said plate facing the bearing in the opening of the pump housing.

4. A packing replacement device for pumps provided with rotating pump shafts, said device comprising a bushing bearing received within an opening provided in a pump housing and rotatably receiving the pump shaft, and an impeller means fixedly secured to said shaft for rotation therewith and disposed in juxtaposition to said bearing and opening in said pump housing for centrifugally forcing fluid away from said bearing and opening, said impeller means including a flat circular and apertured plate and sleeve integrally secured thereto and axially extending therefrom, a plurality of radially disposed vanes fixedly secured to one face of said plate and having their inner ends lying in a cylindrical locus coincidental with an inner surface of said sleeve.

5. A packing replacement device for pumps provided with rotating pump shafts, said device comprising a bushing bearing received within an opening provided in a pump housing and rotatably receiving the pump shaft, and an impeller means fixedly secured to said shaft for rotation therewith and disposed in juxtaposition to said bearing and opening in said pump housing for centrifugally forcing fluid away from said bearing and opening, said impeller means including a flat circular and apertured plate and sleeve integrally secured thereto and axially extending therefrom, a plurality of radially disposed vanes fixedly secured to one face of said plate and having their inner ends lying in a cylindrical locus coincidental with an inner surface of said sleeve, said sleeve being slidably received on the pump shaft and fixedly positioned thereon by means of a pin extending through said sleeve and shaft.

6. A packing replacement device for pumps provided with rotating pump shafts, said device comprising a bushing bearing received within an opening provided in a pump housing and rotatably receiving the pump shaft, and an impeller means fixedly secured to said shaft for rotation therewith and disposed in juxtaposition to said bearing and opening in said pump housing for centrifugally forcing fluid away from said bearing and opening, said impeller means including a flat circular and apertured plate and sleeve integrally secured thereto and axially extending therefrom, a plurality of radially disposed vanes fixedly secured to one face of said plate and having their inner ends lying in a cylindrical locus coincidental with an inner surface of said sleeve, said one face of said plate facing the bearing in the opening of the pump housing.

7. A packing replacement device for pumps provided with rotating pump shafts, said device comprising a bushing bearing received within an opening provided in a pump housing and rotatably receiving the pump shaft, and an impeller means fixedly secured to said shaft for rotation therewith and disposed in juxtaposition to said bearing and opening in said pump housing for centrifugally forcing fluid away from said bearing and opening, said impeller means including a flat circular and apertured plate and sleeve integrally secured thereto and axially extending therefrom, a plurality of radially disposed vanes fixedly secured to one face of said plate and having their inner ends lying in a cylindrical locus coincidental with an inner surface of said sleeve, said bushing bearing including a plate, said bushing bearing plate being of a diameter substantially equal to the diameter of the plate of said impeller means.

8. A packing replacement device for pumps provided with rotating pump shafts, said device comprising a bushing bearing received within an opening provided in a pump housing and rotatably receiving the pump shaft, and an impeller means fixedly secured to said shaft for rotation therewith and disposed in juxtaposition to said bearing and opening in said pump housing for centrifugally forcing fluid away from said bearing and opening, said impeller means including a flat circular and apertured plate and sleeve integrally secured thereto and axially extending therefrom, a plurality of radially disposed vanes fixedly secured to one face of said plate and having their inner ends lying in a cylindrical locus coincidental with an inner surface of said sleeve, said bushing bearing including a plate, said bushing bearing plate being of a diameter substantially equal to the diameter of the plate of said impeller means, said vanes facing said bushing bearing plate and positioned closely adjacent thereto.

MARVIN L. VAN NESS.

References Cited in the file of this patent

UNITED STATES PATENTS

| Number | Name | Date |
|---|---|---|
| 1,346,924 | Wilfley | July 20, 1920 |
| 1,928,795 | Reid | Oct. 3, 1933 |
| 2,122,085 | Castricone | June 28, 1938 |
| 2,478,649 | Wightman | Aug. 9, 1949 |

FOREIGN PATENTS

| Number | Country | Date |
|---|---|---|
| 278,860 | Great Britain | Oct. 20, 1927 |
| 377,645 | Great Britain | 1932 |